(12) United States Patent
Lovett et al.

(10) Patent No.: US 7,134,072 B1
(45) Date of Patent: Nov. 7, 2006

(54) METHODS AND SYSTEMS FOR PROCESSING XML DOCUMENTS

(75) Inventors: Christopher J Lovett, Woodinville, WA (US); Nanshan Zeng, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/417,990

(22) Filed: Oct. 13, 1999

(51) Int. Cl.
*G06F 17/00* (2006.01)

(52) U.S. Cl. ...................................... 715/513

(58) Field of Classification Search ................ 715/513, 715/530; 707/101
See application file for complete search history.

(56) References Cited

U.S. PATENT DOCUMENTS

| | | | | |
|---|---|---|---|---|
| 5,915,259 | A * | 6/1999 | Murata ........................ | 715/513 |
| 6,012,098 | A * | 1/2000 | Bayeh et al. ................ | 709/246 |
| 6,446,256 | B1 * | 9/2002 | Hyman et al. .............. | 717/143 |
| 6,564,252 | B1 * | 5/2003 | Hickman et al. ........... | 709/214 |
| 2002/0120685 | A1* | 8/2002 | Srivastava et al. .......... | 709/203 |
| 2003/0005410 | A1* | 1/2003 | Harless ....................... | 717/114 |

OTHER PUBLICATIONS

"XML Authority" (C) 1999 Extensibility, Inc, retrieved by www.hotbot.com on Aug. 1, 1999 from http://www.structuredmethodsd.com/software.htm.*

Dougherty, XML Authority Ends Waiting Game for Schema Developers, http://www.xml.com/pub/a/1999/07/xmla.html Jul. 1, 1999.*

Chahuneau, "Beyond the SGML DTD," Feb. 2, 1998 http://xml.coverpages.org/chahuneauXML.html.*

Dougherty, Dale, "XML Authority Ends Waiting Game for Schema Developers", Jul. 1, 1999, http://www.xml.com/pub/a/1999/07/xmla.html.*

EXtensible Server Pages (XSP) Layer 1, Jun. 11, 1999, http://xml.coverpages.org/WD-xsp-19990611.html.*

"XML Authority Product Overview" found at http://www.extensibility.com/xml_authority/xml_ath_specs.htm (archived May 8, 1999).*

"Application Programming Interface" found at http://www.coffeycountyks.org/Terms/2461HTML-126.html (Jun. 7, 1999).*

* cited by examiner

*Primary Examiner*—Stephen Hong
*Assistant Examiner*—Adam Queler
(74) *Attorney, Agent, or Firm*—Microsoft Corporation (57) ABSTRACT

An architecture for processing an Extensible Markup Language (XML) document converts schema elements in the XML document to data type definition (DTD) objects that can be used to validate data elements in the XML document. The architecture utilizes a node factory design in which an XML parser calls one or more node factory interfaces to construct an in-memory tree representation of an XML document. One of the node factory interfaces is a schema node factory, which is a thin layer that receives calls from the parser to build nodes in the tree representation and translates those calls to calls to a schema builder. The schema builder is a table driven interface that converts the schema elements in the XML document into DTD objects. The DTD objects are then used to validate the data elements as belonging to the schema. If valid, the data elements are used to construct the tree representation.

17 Claims, 7 Drawing Sheets

METHODS AND SYSTEMS FOR PROCESSING XML DOCUMENTS

TECHNICAL FIELD

This invention relates to methods and systems for processing Extensible Markup Language (XML) documents. More particularly, the invention concerns ways of validating XML data against a predetermined schema and building, from valid XML data, an in-memory tree representation of the XML document.

BACKGROUND

Extensible Markup Language (XML) is a meta-markup language that provides a format for describing structured data. XML is similar to HTML in that it is a tag-based language. By virtue of its tag-based nature, XML defines a strict tree structure or hierarchy. XML is a derivative of Standard Generalized Markup Language (SGML) that provides a uniform method for describing and exchanging structured data in an open, text-based format. XML utilizes the concepts of elements and namespaces. Compared to HTML, which is a display-oriented markup language, XML is a general-purpose language for representing structured data without including information that describes how to format the data for display.

XML "elements" are structural constructs that consist of a start tag, an end or close tag, and the information or content that is contained between the tags. A "start tag" is formatted as "<tagname>" and an "end tag" is formatted as "</tagname>". In an XML document, start and end tags can be nested within other start and end tags. All elements that occur within a particular element must have their start and end tags occur before the end tag of that particular element. This defines a tree-like structure that is representative of the XML document. Each element forms a node in this tree, and potentially has "child" or "branch" nodes. The child nodes represent any XML elements that occur between the start and end tags of the "parent" node.

XML accommodates an infinite number of database schemas. A schema is a set of rules for constraining the structure and articulating the information set of XML documents. A schema describes what data structures, shape, and content of XML documents are valid for a given application. For example, one schema might describe how documents used in an online banking exchange are structured. Other schemas may describe XML documents for email, or XML documents for purchasing blue jeans or music over the Internet.

To illustrate a tree structure constructed from XML data, consider an exemplary XML data exchange between different entities, such as client and server computers, in the form of requests and responses. A client might generate a request for information or a request for a certain server action, and a server might generate a response to the client that contains the information or confirms whether the certain action has been performed. The contents of these requests and responses are XML documents. In many cases, the process of generating these XML documents involves building, in memory, a hierarchical tree structure. Once the hierarchical tree structure is built in its entirety, the actual XML document in proper syntactic form can then be assembled. Consider the following exemplary XML code:

```
<trans:orders    xmlns:person="http://www.schemas.org/people"
    xmlns:dsig=http://dsig.org
    xmlns:trans="http://www.schemas.org/transactions">
    <trans:order>
        <trans:sold-to>
            <person:name>
                <person:last-name>Layman</person:last-name>
                person:first-name>Andrew</person:first-name>
            </person:name>
        </trans:sold-to>
        <trans:sold-on>1997-03-17</trans:sold-on>
        <dsig:digital-signature>1234567890</dsig:digital-signature>
    </trans:order>
</trans:orders>
```

This code includes three XML namespace declarations that are each designated with "xmlns". A "namespace" refers to a dictionary or set of element names defined by the schema. Namespaces ensure that element names do not conflict, and clarify who defined which term. They do not give instructions on how to process the elements. Readers still need to know what the elements mean and decide how to process them. Namespaces simply keep the names straight.

Within an XML document, namespace declarations occur as attributes of start tags. Namespace declarations are of the form "xmlns:[prefix]=[uri]". A namespace declaration indicates that the XML document contains element names that are defined within a specified namespace or schema. "Prefix" is an arbitrary designation that will be used later in the XML document as an indication that an element name is a member of the namespace declared by universal resource indicator "uri". The prefix is valid only within the context of the specific XML document. "Uri" is either a path to a document describing a specific namespace or schema or a globally unique identifier of a specific namespace or schema. Uri is valid across all XML documents. Namespace declarations are "inherited", which means that a namespace declaration applies to the element in which it was declared as well as to all elements contained within that element.

With reference to the above XML code, the namespace declarations include a prefix, e.g. "person", "dsig", and "trans" respectively, and the expanded namespace to which each prefix refers, e.g. "http://www.schemas.org/people", "http://dsig.org", and "http://www.schemas.org/transactions" respectively. This code tells any reader that if an element name begins with "dsig" its meaning is defined by whoever owns the "http://www.dsig.org" namespace. Similarly, elements beginning with the "person" prefix have meanings defined by the "http://www.schemas.org/people" namespace and elements beginning with the "trans" prefix have meanings defined by the "http://www.schemas.org/transactions" namespace.

It is noted that another XML document that incorporated elements from any of the namespaces included in this sample might declare prefixes that are different from those used in this example. As noted earlier, prefixes are arbitrarily defined by the document author and have meaning only within the context of the specific element of the specific document in which they are declared.

Figure 1:
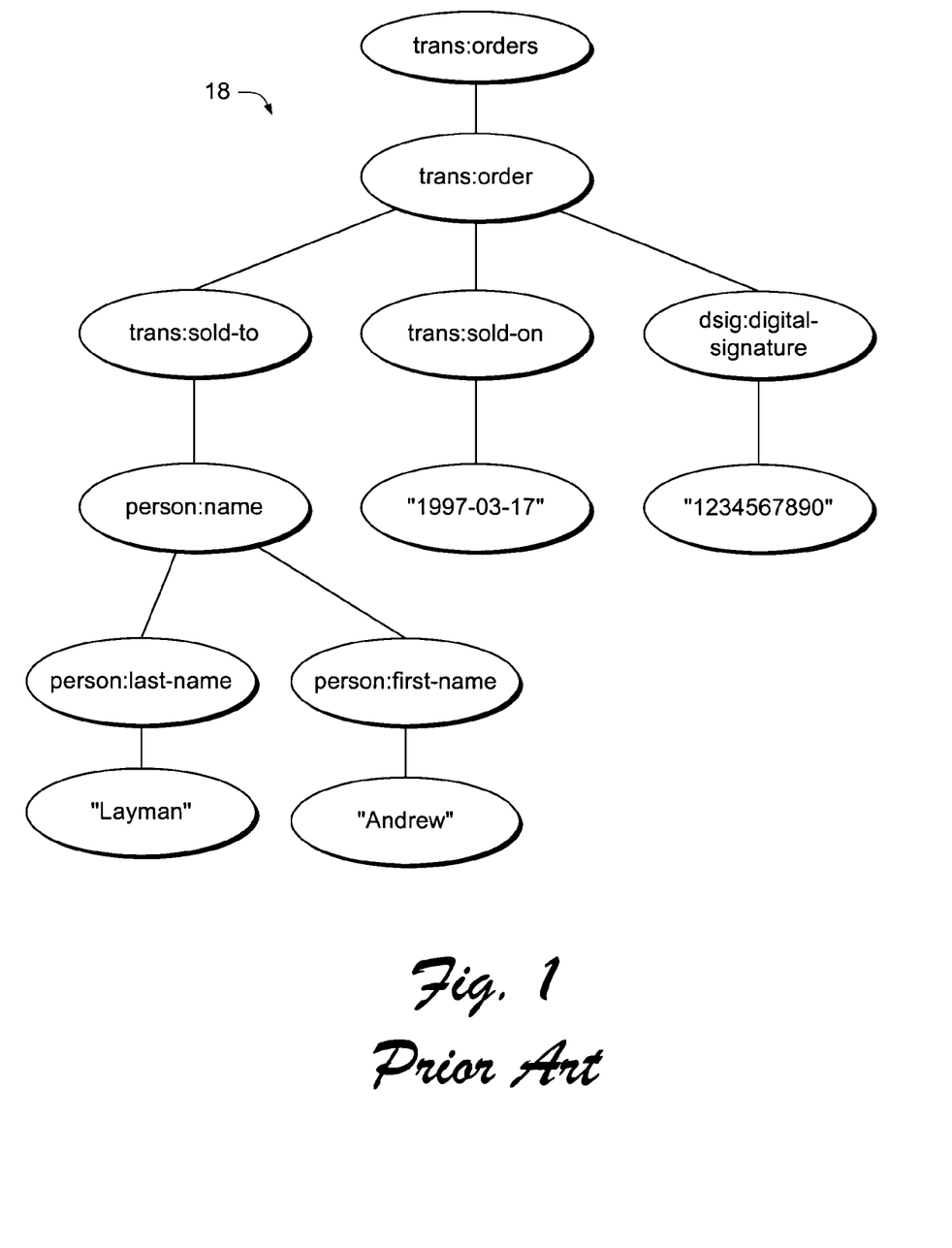
FIG. 1 is diagram of a hierarchical tree structure that represents an XML document.

FIG. 1 shows a hierarchical tree structure 18 that represents the structure of the above XML code. The tree nodes correspond to elements parsed from the XML document. Such a structure is typically constructed in memory, with each node containing all data necessary for the start and end tags of that node. It has been typical in the past to build the entire tree structure before generating the XML document itself.

In XML 1.0, data types in the schemas are defined using a set of data type definitions (DTD). XML documents have two kinds of constraints: well-formedness and validity. The "well-formedness" constraints are those imposed by the definition of XML itself (such as the rules for the use of the < and > characters and the rules for proper nesting of elements). The "validity" constraints are constraints on document structure provided by a particular DTD or XML-Data schema. Schema or DTD validation is very useful in the Internet realm, because entities are able to validate whether data structures received from random or anonymous sources are appropriate for a given context. Suppose, for example, that a company receives XML data from some random user. The company does not necessarily trust the data at this point, and hence utilizes a validation process to determine whether the XML data is good or whether it is noise that can be rejected outright or sent to a system administrator for special consideration.

Figure 2:
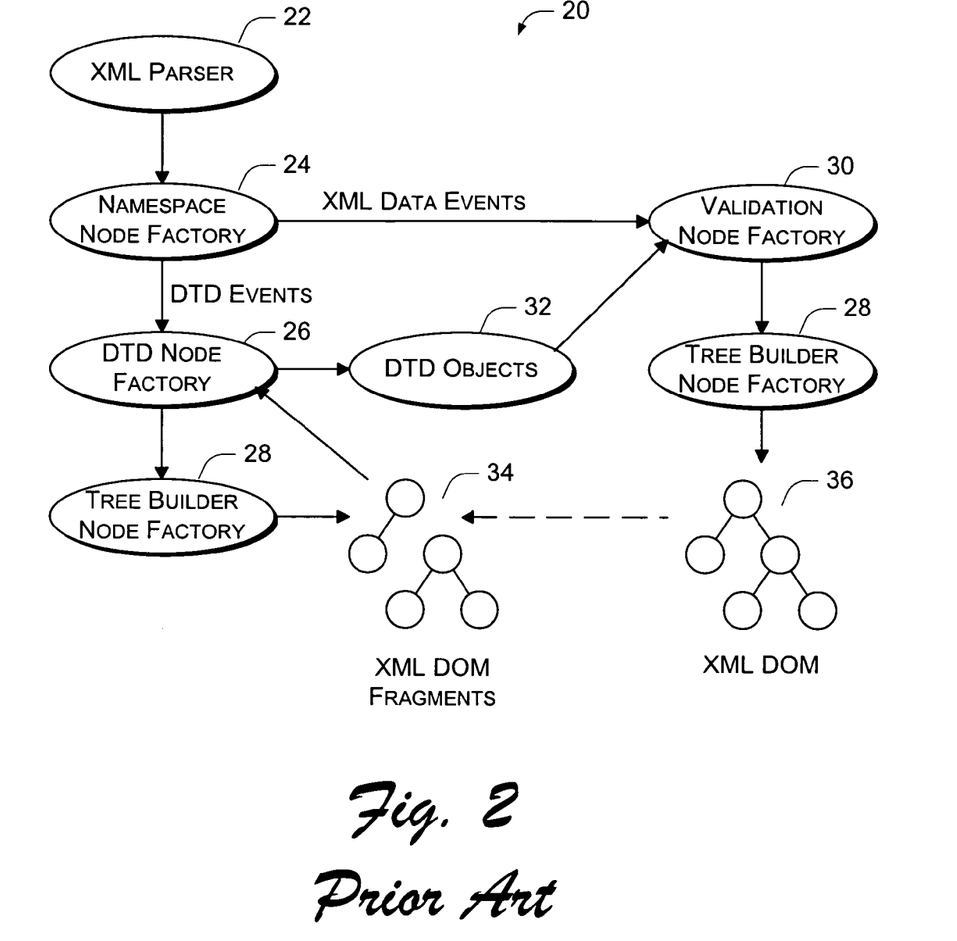
FIG. 2 is a block diagram of a software architecture for parsing XML documents and creating a tree structure.

FIG. 2 shows current software architecture 20 for processing XML documents. The architecture 20 includes an XML parser 22 that receives and parses XML data. The XML data may arrive in a variety of ways, including as a stream, a URL (universal resource locator), or text. Parsing the XML data results in a list of events. For example, suppose the XML data describes an author and title name for a book, as follows:

<Book>
      <author>X</author>
      <title>Y</title>
    </Book>

The parser 22 parses the XML data and returns the following list:

1. "Book" element
2. BeginChildren
3. "Author" element
4. BeginChildren
5. "X", text
6. EndChildren
7. "Title" element
8. BeginChildren
9. "Y", text
10. EndChildren
11. EndChildren As the parser 22 parses the XML data, it calls to one or more node factories. A "node factory" is a callback interface that builds node objects used to construct an in-memory tree representation of the XML document. The node factory may also be used to search the XML document, without building a node object. Custom node factories can be constructed to build different kinds of object hierarchies that reflect the XML document.

In architecture 20, there are four node factories, including a namespace node factory 24, a DTD node factory 26, a tree builder node factory 28, and a validation node factory 30. The XML parser 22 calls the namespace node factory 24, which outputs a sequence of name tokens. DTD events are passed to the DTD node factory 26 and XML data events are passed to the validation node factory 30. The DTD node factory 26 builds DTD objects 32 from the DTD events. The DTD objects 32 are used in the validation process of validating the XML data. The DTD node factory 26 may also delegate to the tree builder node factory 28, which builds XML DOM (Document Object Model) fragments 34 for pieces of the tree structure, or XML DOM.

The validation node factory 30 receives the XML data events from the namespace node factory 24 and uses the DTD objects 32 to evaluate whether the data complies with certain constraints defined by the DTD objects. If the XML data is valid, the tree builder node factory 28 builds a complete XML DOM 36 for the XML data. Some elements of the XML DOM 36 may reference fragments 34.

The architecture 20 is configured for DTD-specific considerations. DTD objects have an advantage in that they are known and previously defined. DTD objects also have a drawback, however, in that they are not extensible. Thus, new data type definitions cannot be easily created. Due to this problem, more recent evolutions of XML are beginning to use XML-data schemas as an additional or alternative way to define data types in schemas. XML-data schemas are not restricted like DTD objects, but are extensible and new ones can be created as needed.

Thus, there is a desire to adapt the architecture of FIG. 2 to handle the more extensible XML-data schemas in addition to DTD objects. One problem with this adaptation is that the node factory interface provides a sequential ordered stream of XML tokens, whereas the XML-data schemas define items in a way that is order independent. This means that the node factory has to store certain states until it knows it can process those states.

Accordingly, there is a need for an improved architecture built around the node factory design, which handles XML-data schemas to build in-memory tree representations and DTD objects for validation purposes. More particularly, the improved architecture should leverage existing components (e.g., DTD validation, namespace node factory, and XML parser) for creating an in-memory representation of the schema and be roughly as fast as the existing architecture. The architecture should also maximize code reuse.

SUMMARY

This invention concerns an architecture for processing XML documents and building in-memory tree representations of the XML documents. More particularly, the architecture accommodates XML-data schemas as a way of defining data types within schemas and converts the XML-data schemas to DTD objects that are used to validate the XML data in the XML document.

In the described implementation, the architecture utilizes a node factory design in which an XML parser calls one or more node factories to construct an in-memory tree representation of the XML document. One of the node factories is a schema node factory, which is a thin layer interface that is callable by the parser. The schema node factory translates the parser calls into calls to a schema builder, which is a table drive component that builds DTD objects used in validation of the XML data. If valid, the XML data is used to construct the in-memory tree representation of the XML document.

DETAILED DESCRIPTION

System

Figure 3:
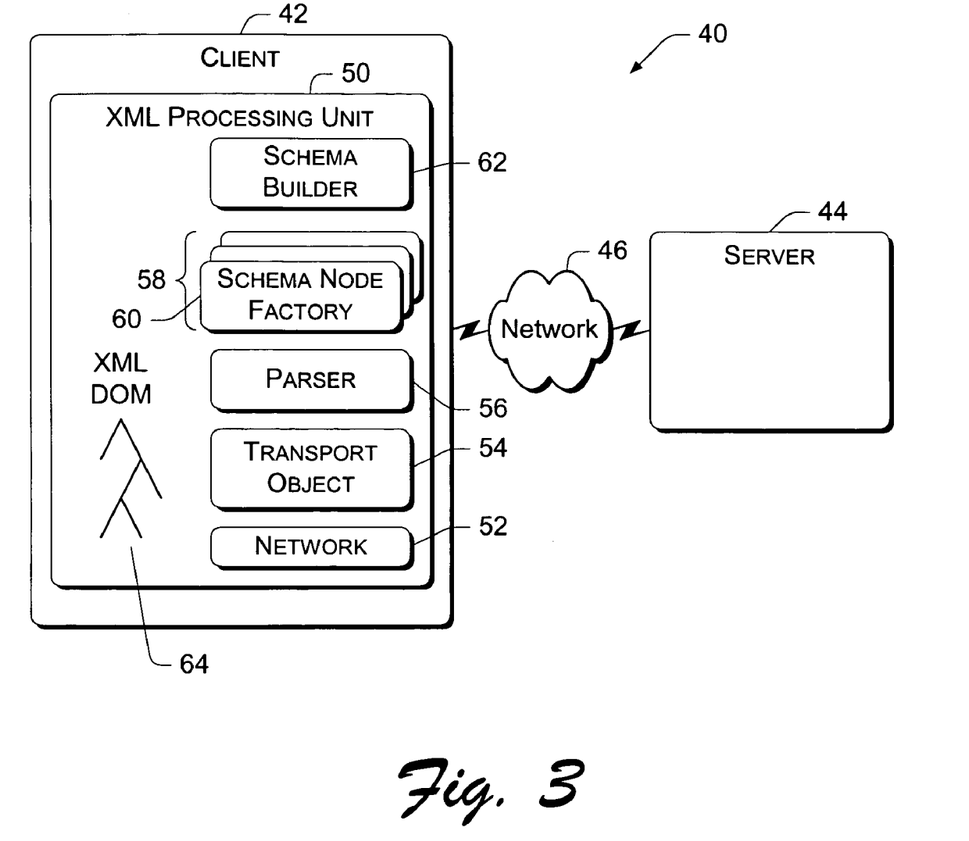
FIG. 3 is a block diagram of a client/server system that exchanges XML documents over a network.

FIG. 3 shows client-server system 40 in which XML documents or data streams are exchanged between a client 42 and a server 44 over a network 46 (e.g., Internet). The client 42 runs one or more applications that generate requests for XML data and receive responses to those requests in the form of XML documents. One specific example of such client-based applications is Outlook Express from Microsoft Corporation.

The client 42 implements an XML processing software architecture 50 that sends, receives, and processes XML documents. The server 44 is equipped with a similar architecture, but will not be described here for brevity purposes. The XML processing unit 50 has a network module 52 (e.g., TCP/IP module) to facilitate connection to the network 46 and a transport object 54 (e.g., a Distributed Authoring and Versioning (WebDAV) transport object) to handle requests and responses over the network. Upon receipt of an XML document, the transport object 54 pushes the XML document into an XML parser 56, which in this example, is a so-called "push-model" parser. The parser 56 parses the XML data stream into individual elements of schema and data. The schema elements establish a schema for an associated application (not shown), while the data element are validated against the schema and if valid, are used to form an in-memory tree representation of the XML document.

The parser 54 calls one or more node factories 58 to construct the in-memory tree representation of the XML document. One of the node factories is a "schema node factory" 60, which is a thin layer interface that receives calls from the parser 54 and delegates the work to another interface known as a "schema builder" 62. The schema builder 62 converts the schema elements contained in the calls to data type definition (DTD) objects. The DTD objects are then used to validate the XML data from the parsed XML document to determine whether the data is valid for the particular schema associated with the application. If valid, the XML data is used to form an in-memory tree representation, which is also known as an XML DOM (Document Object Model) 64.

Architecture

Figure 4:
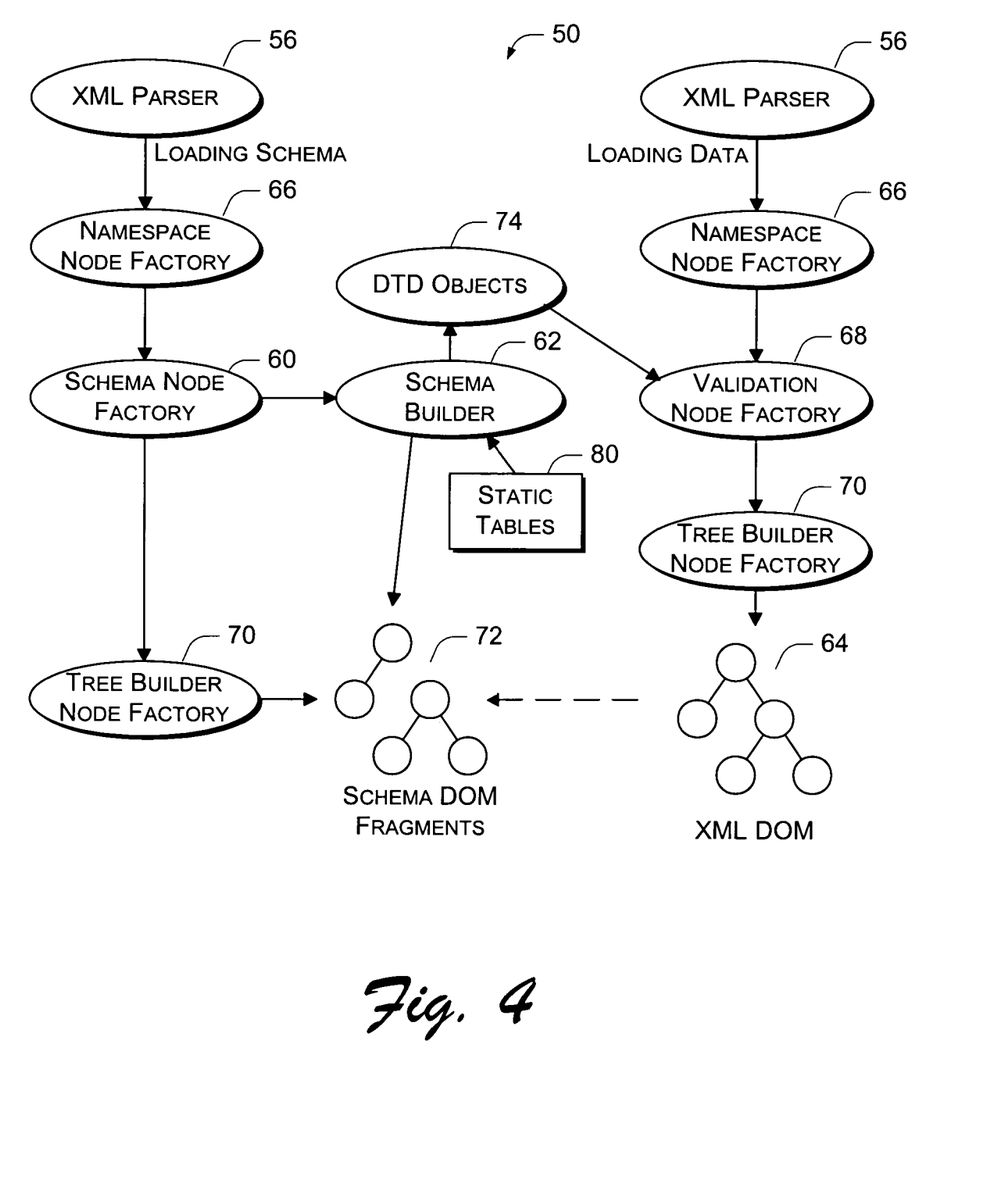
FIG. 4 is a block diagram of an XML processing software architecture, including a schema node factory and schema builder, which is implemented in the client and/or server of the system of FIG. 3.

FIG. 4 shows the XML processing software architecture 50 implemented in client 42. The architecture parses an XML document into schema and data, converts the schema to DTD objects, validates the data using the DTD objects, and constructs an in-memory tree representation of the XML document from valid data. The architecture 50 includes the XML parser 56 that receives and parses XML data. The XML data may arrive in a variety of ways, including as a stream, a URL (universal resource locator), or text. The XML data contains one or more schemas and data.

The parser 56 calls a namespace node factory 66 for both the schema(s) and data. A node factory is a callback interface that builds node objects used to construct an in-memory tree representation of the XML document. The general node factory interface ("IXMLNodeFactory") has several methods, including those listed in Table 1.

TABLE 1

Node Factory Interface

| Method | What it does . . . |
|---|---|
| NotifyEvent | This method informs the node factory where an event occurs within the XML document |
| BeginChildren | This method is called when a node contains children. |
| EndChildren | This method is called when all sub-elements of the given element are complete. |
| Error | This method is called when the parser runs into an error in the XML document. |
| CreateNode | This method is called during parsing for each and every element. |

The name space node factory 66 outputs a sequence of name tokens. Tokens relating to the schema(s) are passed to the schema node factory 60, where as tokens pertaining to the data are passed to a validation node factory 68. The schema node factory 60 is a thin node factory interface that receives the schema-related tokens from the namespace node factory 66 and delegates work to a schema builder 62. The schema node factory 60 also passes the tokens onto the tree builder node factory 70 for construction of schema DOM fragments 72 for pieces of the tree representation.

The schema builder 62 is a table-driven schema interface that utilizes static tables 80 to build DTD objects 74. More particularly, the schema builder 62 includes a state machine that is table driven by values in the static tables 80. The static tables 80 contain information describing the schema schema if you will, including what elements and attributes are valid for XML-Data schemas and the associated functions to call when processing those elements. The static tables 80 are organized in a hierarchy, beginning with a schema root table and cascading down through element and attribute tables and event-to-function mapping tables. The schema builder 62 calls these functions at parse time to construct DTD objects used to test the XML data for validation.

The validation node factory 68 receives the data elements from the namespace node factory 66. The validation node factory 68 uses the DTD objects 74 built by the schema builder 62 to evaluate whether the data elements comply with the constraints set forth in the DTD objects. The validation node factory 68 passes the valid data elements to the tree builder node factory 70 to build the complete XML DOM 64 for the XML data. Some elements of the XML DOM 64 may reference fragments 72.

Figure 5:
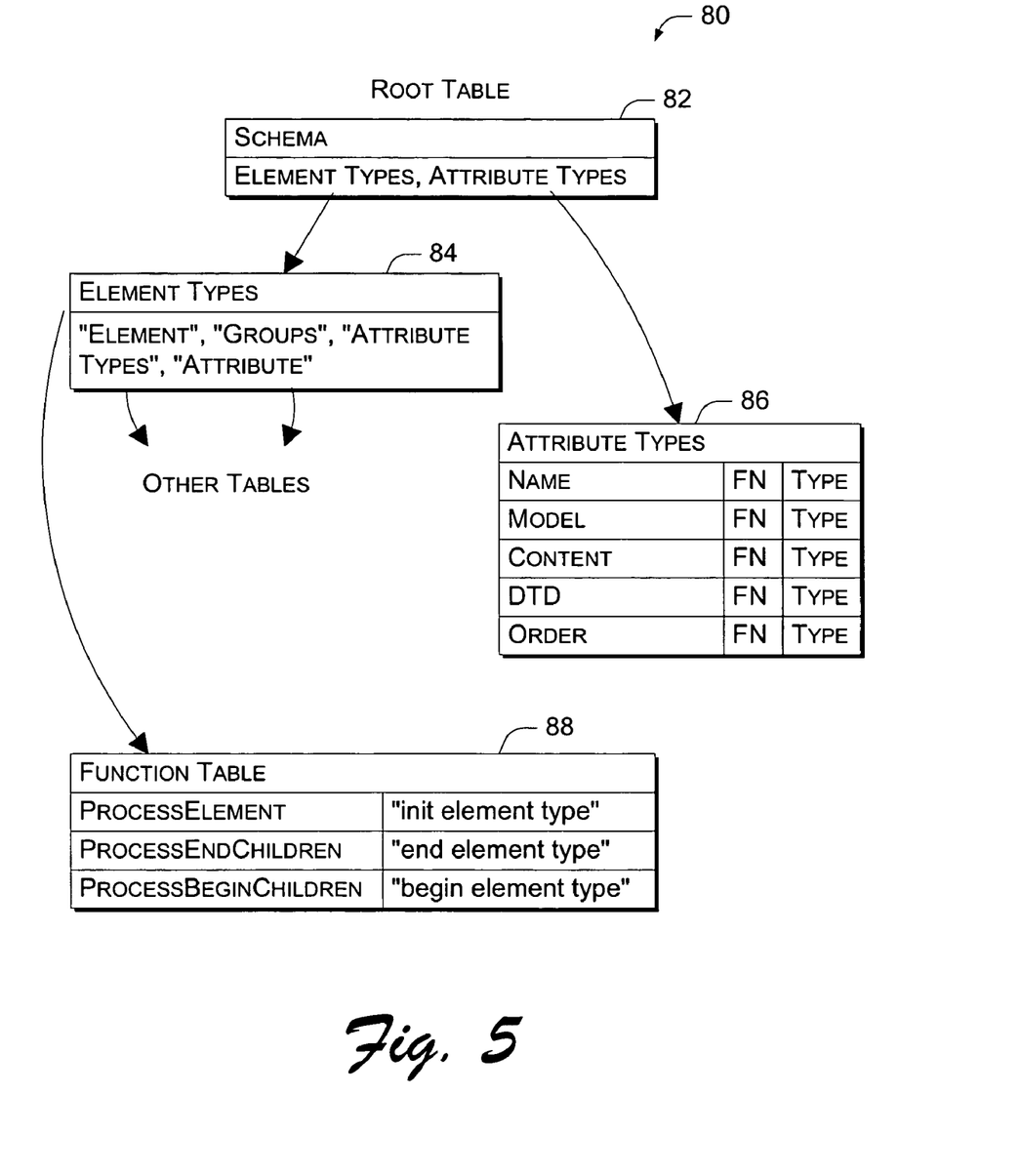
FIG. 5 is a diagram of tables used by the schema builder to convert XML-data schema into DTD objects.

FIG. 5 shows an exemplary table hierarchy of static tables 80 used by the schema builder 62. The table hierarchy includes a schema root table 82 that contains schema information. Root table 82 also contains information on element types and attribute types used in the schema. This information includes a reference (e.g., pointer) to a subordinate table that further describes the types, such as element types table 84 and attribute types table 86.

The element types table 84 contains one or more fields listing types of elements permitted in the schema and references to other tables containing information on specific types. The attribute types table 86 contains one or more fields listing types of attributes in the schema, corresponding functions for handling the attributes, and type descriptions.

The types tables 84 and 86 may further reference one or more function tables. In FIG. 5, the element types table 84 references (e.g., via a pointer) a function table 88 that contains functions pertaining to the IXMLNodeFactory events described in Table 1. The function table includes functions like ProcessElement, ProcessEndChildren, and ProcessBeginChildren.

The schema builder 62 exposes an API (application program interface) to make these and other functions available. In this example, the schema node factory 60 makes calls to the schema builder API, but this API is designed for more general use in other scenarios in addition to the context described here. The schema builder API has several methods, including the methods listed in Table 2.

TABLE 2

Schema Builder Interface

| Method | What it does . . . |
| --- | --- |
| void start( ); | This method signals that a new schema is being processed and the internal state is reset accordingly. |
| void finish( ); | This method signals that an end of the schema has been reached. It checks whether all elements referenced in the schema have been declared. |
| ProcessElementNode (Node * pNode); | This method is called for each schema element in the document. This occurs when the schema builder looks up the new schema element (e.g., ElementType or AttributeType) in the element types table 84 or attribute types table 86 for the current schema element. If the element is allowed (i.e., listed in the table), the method pushes the current element onto a stack and calls the "init" function defined in the function table 88 for the new schema element. The "init" function initializes one or more data structures for the new schema element and creates empty DTD objects for that element. |
| ProcessAttributes (IXMLNodeSource * pSource, Node * pNode); | This method is called when all attributes are ready to be processed for the current schema element. This occurs when the schema builder walks through the attributes in the XML DOM 64 for the schema, looks them up in the attribute types table 86 for the current schema element, parses the attribute value according to the attribute type, and calls the function for handling that attribute. |
| ProcessPCDATA (Node * pNode, PVOID pParent); | This method is called for each Text node (including attribute values) in the XML document. This method determines whether it is valid to have text in the current position within the schema document and generates an error if it is not valid. |
| ProcessEndChildren (IXMLNodeSource * pSource, Node * pNode); | This method is called when the end of all children for the current schema is reached. This method determines if all content for the current schema element has been correctly provided, along with any final default values. For ElementType elements, the method finishes the content model, which may involve creating a few more DTD content model nodes for describing certain default values. |

Exemplary Computer System

Figure 6:
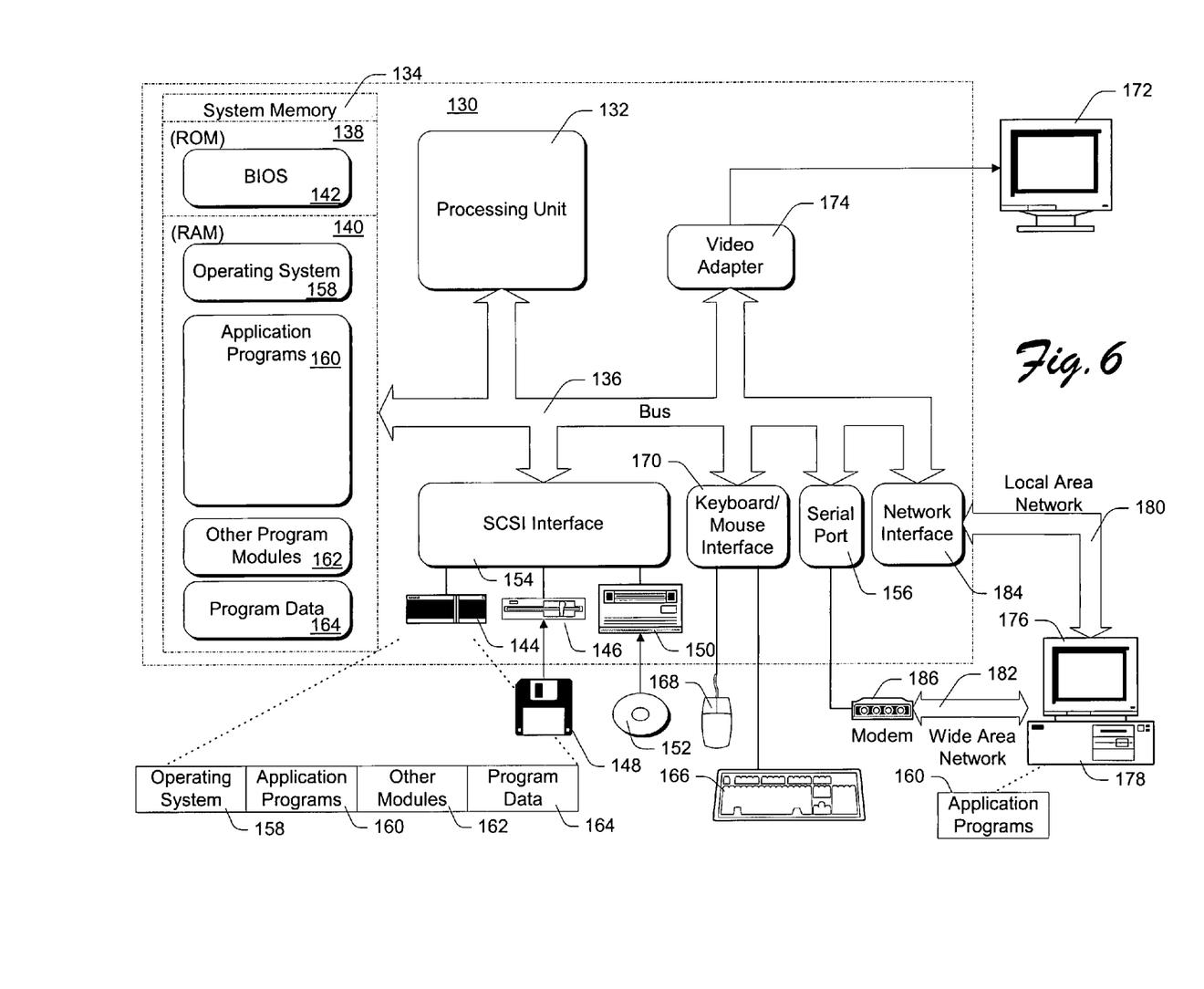
FIG. 6 is a block diagram of a computer system that is suitable for implementing the invention.

FIG. 6 shows a general example of a computer 130 that can be used in accordance with the invention. Various numbers of computers such as that shown can be used in the context of a distributed computing environment. The computer 130 is representative of one implementation of client 42 and/or server 44.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by a SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated. The logical connections include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks. It is recognized that such programs and components reside at various times in different storage components of the computer, and are executed by the data processor(s) of the computer.

Operation

Figure 7:
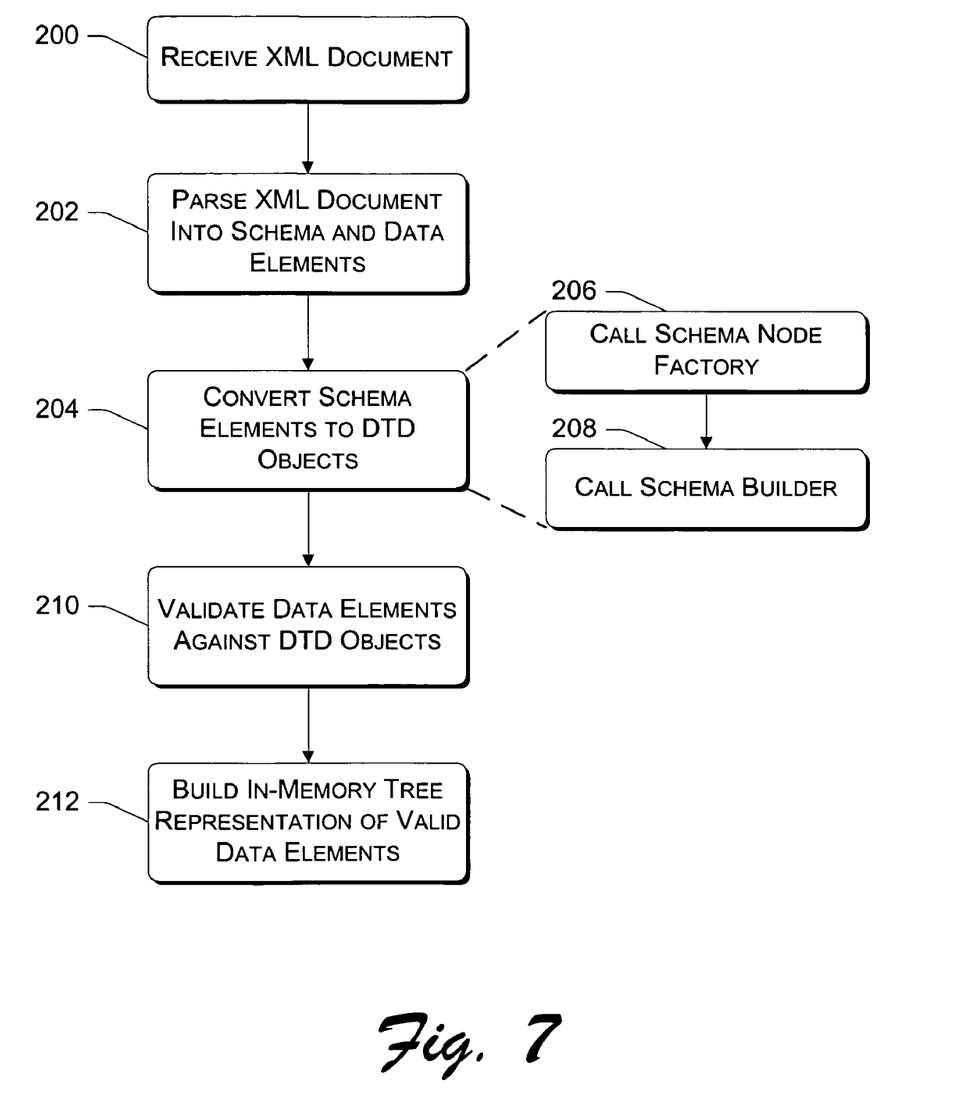
FIG. 7 is a flow diagram showing a method for processing an XML document.

FIG. 7 shows a method for processing an XML document. The steps are performed in software and will be described with additional reference to the architecture 50 of FIG. 4.

At step 200, an XML document is received at the parser 56. The XML document consists of XML data that is articulated by and complies with a schema. The parser 56 parses the XML document to produce both data elements and schema elements (step 202).

After parsing, the schema elements are converted to DTD objects 74, which are used to validate the XML data (step 204). More particularly, the conversion step involves the parser 56 calling the schema node factory 60 (i.e., CreateNode) to create a node in the tree that represents the schema element (step 206). The schema node factory 60 in turn calls the schema builder interface 62 (e.g., Table 2 calls) to process the individual elements and construct data type definition (DTD) objects used in validating the data elements (step 208).

To illustrate how the schema node factory 60 and schema builder 62 operate, consider the oft-used CreateNode call (Table 1) made from the parser 56 to the schema node factory 60. The architecture translates the CreateNode calls into the DTD objects 74. For discussion purposes, suppose the following schema fragment is input:

<Schema xmlns="urn:schemas-microsoft-com:xml-data">
  <ElementType name="foo" model="open">
  </ElementType>
</Schema>

Table 3 lists the series of calls made to the schema node factory 60 and schema builder 62 for this schema fragment.

TABLE 3

Calls Generated In Response for Parser's CreateNode Call

| SchemaNodeFactory Call | SchemaBuilder Call | Resulting Action |
| --- | --- | --- |
| NotifyEvent STARTDOCUMENT | Start | Initialize state and create new empty DTD object. |
| CreateNode ELEMENT "Schema" | ProcessElementNode | Set current state to point to the Schema element state table. |
| CreateNode ATTRIBUTE "xmlns" | No operation | |
| CreateNode TEXT "urn: . . ." | ProcessPCDATA | Attribute text is a no operation. |
| BeginChildren | ProcessAttributes | "xmlns" is a skippable attribute, so this is a no operation. |
| CreateNode ELEMENT "ElementType" | ProcessElementNode | "ElementType" is an allowable child of "Schema" so push "Schema" onto the stack and initialize a new ElementDecl DTD object with default content model EMPTY. |
| CreateNode ATTRIBUTE "name" | No operation | |
| CreateNode TEXT "foo" | ProcessPCDATA | Attribute text is a no operation. |
| CreateNode ATTRIBUTE "model" | No operation | |
| CreateNode TEXT "open" | ProcessPCDATA | Attribute text is a no operation. |
| BeginChildren | ProcessAttributes. | Calls BuildElementName, which initializes name of the ElementDecl DTD object and validates that an ElementDecl named "foo" has not already been declared. Calls BuildElementModel, which validates the value "open" and sets the model to open. |
| EndChildren "ElementType" | ProcessEndChildren | Calls EndElementType, which determines that there are no child elements in the schema fragment and that the content model is open. Changes the default content model from EMPTY to ANY. Pops current state back to "Schema" State |
| EndChildren "Schema" | ProcessEndChildren | No cleanup function for "Schema" state. Pops "Schema" state back to initial state. |
| NotifyEvent ENDDOCUMENT | Finish | Checks for referenced but undeclared element types-and there are none. |

With reference again to FIG. 7, the data elements from the parsed XML document are evaluated against the DTD objects 74 to determine whether the data elements are valid (step 210). If valid, the tree builder node factory 70 constructs the in-memory tree representation of the XML data (step 212).

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for processing an extensible mark up language (XML) document comprising:
    parsing the XML document into a stream of schema elements and data elements;
    receiving the stream of schema elements using an API;
    converting the stream of schema elements into data type definition (DTD) objects;
    validating the stream of data elements using the DTD objects; and
    if valid, passing the stream of data elements to an application using the API; wherein the converting step comprises:
    obtaining a parameter from a static table; and
    calling a function to construct a DTD object based on the schema element, the function constructing the DTD object based on the parameter from the static table.

2. The method of claim 1, wherein the converting further comprises:
    calling a method in a first application program interface (API); and
    as a result of calling the first method, calling one or more methods in a second API to construct the DTD objects.

3. The method of claim 1, wherein the converting comprises referencing the static table, the static table defining the schema elements and associated functions for processing the schema elements.

4. A computer-readable medium having computer-executable instruction, which when executed by a computer, performs the method of claim 1.

5. The method of claim 1 wherein the function comprises at least one of a function for signaling a new schema is being processed, signaling that an end of a schema has been reached, determining if it is valid to have text in a current position of a schema document, determining if all content for a current schema element has been corrected provided, and creating a DTD content model node for describing a default value.

6. The method of claim 1 wherein the step of calling the function includes:
    identifying a new schema element in the static table;
    pushing the new schema element onto a stack;
    initializing at least one data structure for the new schema element; and
    creating an empty DTD object for the new schema element.

7. The method of claim 1 wherein the static table includes an attribute table for providing an attribute of a schema element and wherein the step of calling the function includes parsing the attribute table for an attribute value corresponding to the schema element and calling a function corresponding to the attribute value.

8. The method of claim 1 wherein the static table is organized in a hierarchical arrangement and includes a schema root table at a top of the hierarchical arrangement, the schema root table including a reference to a subordinate table for describing a type of the schema element.

9. The method of claim 8 wherein the subordinate table includes at least one of an element table and an attribute table, the element table including at least one field listing a type of element permitted in the schema element and the attribute table including at least one field listing a type of attribute in the schema and a corresponding function for handling the attribute.

10. The method of claim 9 wherein the static table includes the element table, the element table further referencing at least one function table and wherein the at least one function table contains functions pertaining to node events.

11. The method of claim 1 wherein the converting step comprises:
    wherein the function includes:
        identifying a new schema element in the static table;
        pushing the new schema element onto a stack;
        initializing at least one data structure for the new schema element; and
        creating an empty DTD object for the new schema element,
    wherein the function constructing the DTD object is based on the parameter from the static table and including one of signaling a new schema is being processed, signaling that an end of a schema has been reached, determining if it is valid to have text in a current position of a schema document, determining if all content for a current schema element has been corrected provided, creating a DTD content model node for describing a default value,
    and wherein the static table is organized in a hierarchical arrangement including a schema root table at a top of the hierarchical arrangement, an attribute table for providing an attribute of a schema element including at least one field listing a type of attribute in the schema and corresponding functions for handling the attribute, and an element table including at least one field listing a type of element permitted in the schema element, the element table further referencing at least one function table containing a function pertaining to node events,
    and wherein the step of calling the function includes parsing the attribute table for an attribute value corresponding to the schema element and calling a function corresponding to the attribute value.

12. A computer implemented with an architecture for processing an extensible mark up language (XML) document comprising:
    a parser to parse the XML document into a stream of elements including a stream of schema elements and a stream of data elements;
    a converter to convert the stream of schema elements into data type definition (DTD) objects using an API and to validate the stream of data elements using the DTD objects;
    wherein the converter further obtains a parameter from a static table and calls a function to construct a DTD object based on the schema element, the function constructing the DTD object based on the parameter from the static table; and
    a schema node factory to pass valid data elements to an application using the API.

13. The computer of claim 12, wherein the architecture further comprises a schema builder that utilizes one or more tables to process the elements, the tables containing information defining a schema for the XML data.

14. A client-server system, comprising:
    a server;

a client connectable to the server to exchange extensible mark up language (XML) documents;

at least one of the client and the server comprising the computer of claim 12.

15. The computer of claim 12, wherein the architecture further comprises a validation node factory to evaluate whether the data elements comply with constraints set forth in the DTD objects.

16. The computer of claim 12 wherein the converter further identifies a new schema element in the static table, pushes the new schema element onto a stack, initializes at least one data structure for the new schema element, and creates an empty DTD object for the new schema element.

17. A computer implemented with an architecture for processing an extensible mark up language (XML) document comprising:

a parser to parse the XML document into a stream of elements including a stream of schema elements and a stream of data elements;

a converter to convert the stream of schema elements into data type definition (DTD) objects using an API and to validate the stream of data elements using the DTD objects; and a schema node factory to pass valid data elements to an application using the API; wherein the converter further obtains a parameter from a static table and calls a function to construct a DTD object based on the schema element including:

identifying a new schema element in the static table;

pushing the new schema element onto a stack;

initializing at least one data structure for the new schema element; and creating an empty DTD object for the new schema element, wherein the function to construct the DTD object is based on the parameter from the static table and including one of signaling a new schema is being processed, signaling that an end of a schema has been reached, determining if it is valid to have text in a current position of a schema document, determining if all content for a current schema element has been corrected provided, creating a DTD content model node for describing a default value, and wherein the static table is organized in a hierarchical arrangement including a schema root table at a top of the hierarchical arrangement, an attribute table for providing an attribute of a schema element including at least one field listing a type of attribute in the schema and corresponding functions for handling the attribute, and an element table including at least one field listing a type of element permitted in the schema element, the element table further referencing at least one function table containing a function pertaining to node events, and wherein the step of calling the function includes parsing the attribute table for an attribute value corresponding to the schema element and calling a function corresponding to the attribute value.

* * * * *